(No Model.)
P. WERUM.
HORSE HAY FORK.
No. 316,857. Patented Apr. 28, 1885.
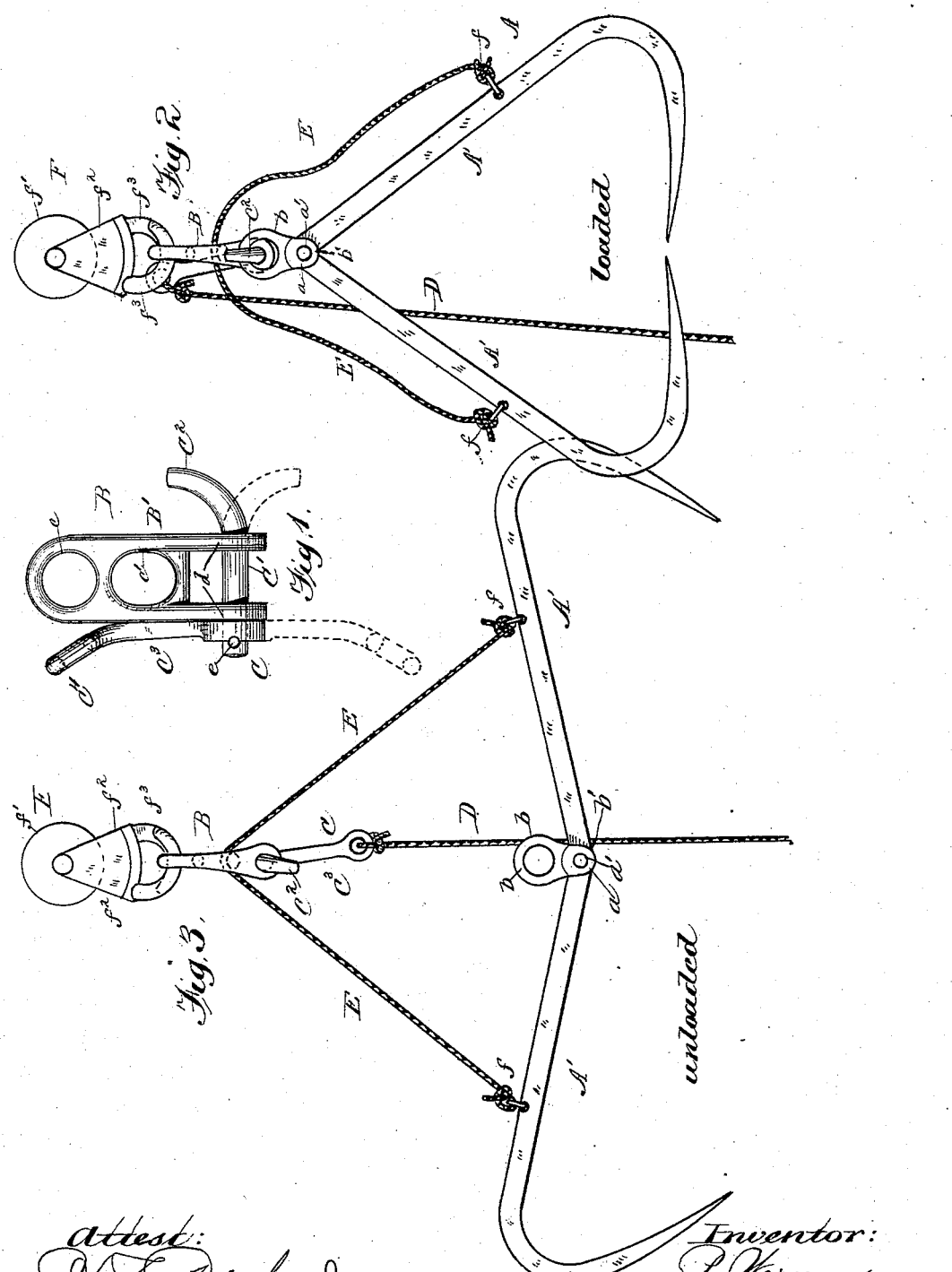

UNITED STATES PATENT OFFICE.

PHILLIP WERUM, OF STRYKER, OHIO.

HORSE HAY-FORK.

SPECIFICATION forming part of Letters Patent No. 316,857, dated April 28, 1885.

Application filed December 18, 1884. (No model.)

*To all whom it may concern:*

Be it known that I, PHILLIP WERUM, a citizen of the United States, residing at Stryker, in the county of Williams and State of Ohio, have invented certain new and useful Improvements in Horse Hay-Forks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in horse hay-forks, especially adapted for elevating and storing hay, straw, &c., in connection with a hay elevator and carrier of the class shown and described in my Patent No. 291,822, dated January 8, 1884.

My invention has for its object the provision of a hay-fork with means for suspending and elevating the same, which shall be simple and durable in construction and efficient in operation; and to these ends the invention consists of the construction, combination, and arrangement of the various parts for service, substantially as hereinafter fully set forth, and pointed out in the claims.

The invention is fully illustrated in the accompanying drawings, which form a part of this specification, and in which—

Figure 1 is a side elevation of the carrying and tripping device. Fig. 2 is a side view of the fork, tripping device, and suspending-pulley in a loaded condition; and Fig. 3 is a similar view of the same parts, showing the fork and tripping device in the positions they occupy when the load has been discharged.

Similar letters of reference in the several drawings denote like or corresponding parts in all the figures.

Referring to the drawings, A designates the fork, consisting of the curved tines $A'$ $A'$, pivoted to each other at their upper ends, as at $a$, by a pin or bolt, $a'$, and having a suspending ring or hook, $b$, provided with bifurcated lower portion, $b'$, also pivoted on said pin $a'$.

B designates the fork suspending and tripping device, consisting, substantially, of a frame, $B'$, preferably rectangular in shape, having apertures $c\ c'$ in its upper portion, and bifurcated or cut away in its lower portion to provide two arms, $d\ d$, through which passes a shaft or rod, C. This shaft has a straight portion, $C'$, which bears in and projects beyond the arms of the frame $B'$, one end of said shaft being hook-shaped, as at $C^2$, and having its other end provided with an upright operating-lever, $C^3$, fitted over the same and held or keyed in place by a pin, $e$, or by other suitable means. This lever is adapted to bind against one of the faces of the frame when the fork is being elevated, and thereby be held in a vertical position, and said lever is provided at its upper end with an outwardly-bent portion, $C^4$, having an eye, to which is secured a rope, D, reaching to any suitable point.

E designates a cord or rope, having its ends secured to the tines of the fork, as at $f\ f$, and passing through the eye $c'$, of the frame $B'$, whereby the fork is held in an extended and suspended position therefrom when the load has been discharged, as seen in Fig. 3.

F designates a pulley passing over the elevating-rope, secured to the elevating and carrying carriage, (not shown herein,) said pulley consisting of a sheave, $f'$, and two cheek-plates, $f^2$, separate from each other, pivoted to the axis or pin of the sheave, and having arms or hooks $f^3$, which engage the eye or aperture $c$, made solid in the frame $B'$, thus suspending the frame from the elevating-rope, (not shown,) which in turn supports the fork.

The above-described pulley forms the subject-matter of an application heretofore filed by me, dated December 15, 1884, Serial No. 150,444; but it is obvious that a pulley of any other construction or of ordinary construction may be employed without departing from my invention.

The operation of my invention is as follows: The fork, with its load, is suspended from the hook $C^3$ by the ring $b$, as shown in Fig. 2, and the whole apparatus elevated to the carriage hereinbefore referred to. Upon the carriage reaching its destination the operator pulls upon the cord or rope D, thereby depressing the lever $C^3$, which in turn throws the hook $C^2$ downward and causes the ring $b$ of the fork to become disengaged therefrom, thereby causing the fork to fall and the tines thereof to be spread apart by the action of the cord or rope E pulling upon the said tines, thus discharging the load of hay or other material and forcing the fork into an opened position, as shown in Fig. 3, to receive another load of hay or straw upon the fork being lowered.

My invention can also be used without the hay-carriage, as it is only necessary to secure one end of the elevating-rope to a barn, derrick, or other place, and to pass the free end of the rope to which the power is applied over a pulley or sheave, the pulley F, fork, and tripping device being arranged between such fixed end of the rope and pulley, whereby upon the rope being drawn over the said pulley the entire apparatus will be elevated to the desired height and the load discharged—as, for instance, in stacking hay or in elevating ice within an ice-house.

I am aware that modifications in the form and proportion of parts herein shown and described as an embodiment of my invention can be made without departing from the principle or sacrificing the advantages thereof, as, for instance, the rope and ring could be secured differently to the tines. I would therefore have it understood that I hold myself at liberty to make such changes and alterations as fairly fall within the scope of my invention.

Having thus fully described my invention, what I claim as new, and desire to secure by Letters Patent of the United States, is—

1. In a hay-fork, the combination of the supporting-frame provided with eyes and bifurcated lower portion which forms arms in which are mounted a rock-bar having a hook-shaped end and a lever, the pivoted tines having a ring or eye, and a cord or rope passing loosely through an eye of the supporting-frame and connected to the tines, as and for the purpose set forth.

2. In a hay-fork, the combination of the pivoted tines having an eye or ring, a supporting-frame provided with two arms, and a rock-bar mounted in said arms and having a hook at one end and a lever at its other end adapted to bind against the face of the said frame, a tripping cord or rope connected to said lever, and a cord or rope passing through an eye of the frame and connected to the tines, substantially as shown and described.

3. In a hay-fork, the combination of a fork-supporting frame having a solid ring or eye with a pulley having divided cheek-plates and hooks, substantially as described.

4. In a hay-fork, the combination of a fork consisting of two tines pivoted together and having a suspending-ring, a supporting-pulley having divided cheek-plates, a tripping device comprising a frame provided with eyes and a hook-shaped rock-bar, and a cord or rope passing through one of said eyes of the tripping-device and connected to the tines of the fork, substantially as shown and described.

5. In a hay-fork, the combination of a fork consisting of two tines and a suspending-ring pivoted together, a tripping device having a frame provided with eyes and a bifurcated portion, a rock-shaft mounted in the arms of the frame and having at one end a hook, as $C^2$, and a lever at its opposite end adapted to bind against the face of the frame, a trip cord or rope connected to said lever, a suspending-pulley connected to said tripping device, and a cord or rope passing through the tripping device and connected at its free ends to the tines of the fork, all arranged and adapted to serve as set forth.

In testimony whereof I affix my signature in presence of two witnesses.

PHILLIP WERUM.

Witnesses:
W. B. KITZMILLER,
J. J. FULLER.